US009538528B2

(12) United States Patent
Wagner et al.

(10) Patent No.: US 9,538,528 B2
(45) Date of Patent: Jan. 3, 2017

(54) EFFICIENT CO-EXISTENCE METHOD FOR DYNAMIC SPECTRUM SHARING

(75) Inventors: Gustavo Wagner, Aalborg (DK); Andrea Cattoni, Nibe (DK); Istvan Zsolt Kovacs, Aalborg (DK)

(73) Assignee: Nokia Solutions and Networks Oy, Espoo (FI)

( * ) Notice: Subject to any disclaimer, the term of this patent is extended or adjusted under 35 U.S.C. 154(b) by 505 days.

(21) Appl. No.: 14/350,118

(22) PCT Filed: Oct. 6, 2011

(86) PCT No.: PCT/EP2011/067454
§ 371 (c)(1),
(2), (4) Date: Apr. 7, 2014

(87) PCT Pub. No.: WO2013/050076
PCT Pub. Date: Apr. 11, 2013

(65) Prior Publication Data
US 2014/0248895 A1    Sep. 4, 2014

(51) Int. Cl.
*H04W 72/00*     (2009.01)
*H04W 72/04*     (2009.01)
*H04L 5/00*      (2006.01)
*H04W 88/08*     (2009.01)

(52) U.S. Cl.
CPC ........ *H04W 72/0446* (2013.01); *H04L 5/0033* (2013.01); *H04L 5/0062* (2013.01); *H04W 88/08* (2013.01)

(58) Field of Classification Search
USPC .................................. 455/452.1, 452.2, 454
See application file for complete search history.

(56) References Cited

U.S. PATENT DOCUMENTS

2009/0191813 A1    7/2009  Abedi .......................... 455/62

FOREIGN PATENT DOCUMENTS

EP         2 254 380 A1    11/2010
WO    WO 2010/133437 A1   11/2010

OTHER PUBLICATIONS

3GPP TSG RAN WG1 #58, Shenzhen, China, Aug. 24-28, 2009, R1-093278, "Cognitive Interference Management for Type I Relays", CEWit, 6 pgs.
Friedman, James W., et al., "Learning in Gages by Random Sampling", Apr. 27, 2000, Journal of Economic Theory, Elsevier, vol. 98(1), 54 pgs.

(Continued)

*Primary Examiner* — Vladimir Magloire
*Assistant Examiner* — Sayed T Zewari
(74) *Attorney, Agent, or Firm* — Harrington & Smith

(57) ABSTRACT

An apparatus defines a set of resources out of a first number of orthogonal radio resources and controls a transmitting means to simultaneously transmit a respective first radio signal for each resource on all resources of the set. A respective estimated interference is estimated on each of the resources of the set when the respective first radio signals are transmitted simultaneously. A first resource of the set is selected if the estimated interference on the first resource exceeds a first predefined level and, in the set, the first resource is replaced by a second resource of the first number of resources not having been part of the set. Each of the controlling and the estimating, the selecting, and the replacing is performed in order, respectively, for a predefined time.

22 Claims, 3 Drawing Sheets

(56) References Cited

OTHER PUBLICATIONS

Narayanan, L., "Channel Assignment and Graph Multicoloring", © 2002 John Wiley & Sons. Inc., 24 pgs.
Suris, Juan E., et al., "Asymptotic Optimality for distributed Spectrum Sharing using Bargaining Solutions", © 2009 IEEE, 13 pgs.
Tan, Li, et al., "Graph Coloring Based spectrum Allocation for Femtocell Downlink Interference Mitigation", © 2011 IEEE, 5 pgs.

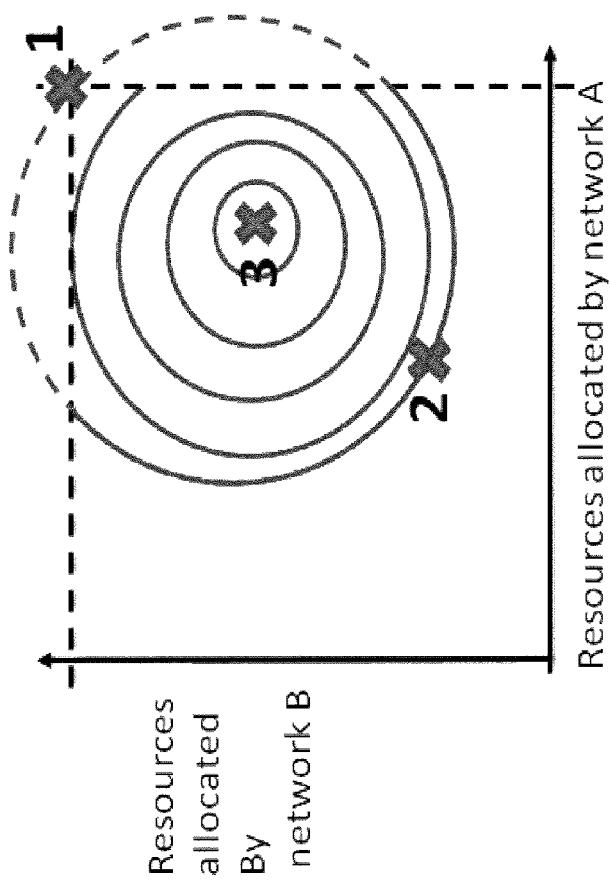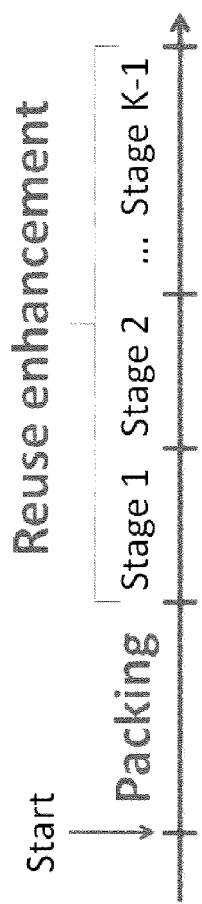

EFFICIENT CO-EXISTENCE METHOD FOR DYNAMIC SPECTRUM SHARING

FIELD OF THE INVENTION

The present invention relates to an apparatus, a method, a system, and a computer program product related to spectrum sharing. More particularly, the present invention relates to an apparatus, a method, a system, and a computer program product for spectrum sharing in the co-existence model.

BACKGROUND OF THE INVENTION

Abbreviations

CC Component Carrier
DSA Dynamic Spectrum Allocation
EDGE Enhanced Data Rates for GSM Evolution
GERAN GSM Edge RAN
GSM Global system for mobile communication
IMT International Mobile Telecommunications
LTE Long-term Evolution
Mbps Megabits per second
UMTS Universal Mobile Telecommunications System
Wi-Fi Wireless Fidelity (WLAN multivendor and interoperability compatibility)
WLAN Wireless Local Area Network Due to the wireless data traffic growth foreseen for next years fixed spectrum assignment will soon become ineffective. The reason is simple: the amount of spectrum that can potentially be assigned to the new wireless communication systems is not enough to meet the traffic demand.

When networks are managed by different people/organizations, then centralized solutions for dynamic spectrum allocation involve much more than technical factors and therefore, in some cases, they may not be possible at all. In such cases, decentralized solutions for assigning the resources (spectrum, time) are preferred.

The relevance of decentralized/distributed algorithms for resources (spectrum/time) assignment is also growing due to changes in topology of wireless systems. For IMT-Advanced systems, local area solutions become of paramount importance. In such cases, planning large networks may be very difficult due to the existence of thousands of nodes. Instead, each local area network should decide its own spectrum assignment autonomously. The goal of the proposed methodology is to act as a reliable and efficient spectrum assignment algorithm for completely autonomous local area operation.

Dynamic Spectrum Allocation (DSA) comprises of dynamic selection of spectrum for the wireless networks in a particular region. This contrasts to a fixed spectrum assignment, where each network must operate on the assigned resources, even when other resources are not in use.

There are 2 main paradigms for DSA: co-existence and cooperation.

In the co-existence DSA model, the wireless networks do not (or cannot) exchange signalling messages with other wireless networks. Nevertheless, this does not preclude signalling messages within a network, which is actually a requirement in order to have measurements from different nodes taken into account.

In the cooperation DSA model, the wireless networks can exchange messages, but this leads to several concerns in terms of overhead, security, scalability and resilience to new technological developments.

It is known that cooperative DSA algorithms generally achieve results which are not achievable by co-existence algorithms to this date. Methods which need signalling may need to be standardized on a regulation level as well.

The literature on DSA is growing quite fast. For this reason, only a few relevant sources are described hereinafter.

In [SURIS09], bargaining processes are investigated in the context of DSA.

The idea behind bargaining is the following: if players (decision makers) can talk to each other, they can try to achieve an agreement point (efficient spectrum allocation) which will benefit everyone more than the disagreement solution (e.g., reuse 1 allocation/aloha).

In [SURIS09] the authors compare different solutions inspired by bargaining mechanisms from Game theory: Egalitarian solution, Nash bargaining solution and Kalai-Smorodinsky solution.

First, they show the theoretical potential of such approaches. Then they propose distributed approximations (since exact calculations would involve all nodes in the region of interest). These distributed approximations are reported to have an interesting balance between performance and fairness.

The main drawback of such approaches is the potentially heavy need for signalling among networks. According to their own words "There is an underlying method for information exchange such that nodes within two hops of one another can communicate within a time scale shorter than the time scale for updates to channel allocation." Such communication can be costly and it ultimately imposes restriction on spectrum agility. What is the real benefit of a cooperative DSA solution, deducing the signalling costs and additional complexity is yet to be seen.

According to [GRACE09] of the present inventors, to the best of our knowledge, much better performance is achieved than by other state-of-art co-existence DSA methods. According to this document, fine-tuning the weights (a set of parameters of [GRACE09]) is required for the particular scenario.

For a detailed understanding of the present invention, [FRIEDMAN01] and [Narayanan02] are helpful.

REFERENCES

[GRACE09] Costa, G. W. O., Cattoni, A. F. Kovacs I. Z., "A Distributed Method for Efficient Dynamic Physical Resources Allocation", Publication numbers EP2254380 and WO2010/133437;

[SURIS09] Suris, J. E.; Dasilva, L. A.; Zhu Han; Mackenzie, A. B.; Komali, R. S., "Asymptotic optimality for distributed spectrum sharing using bargaining solutions," Wireless Communications, IEEE Transactions on, vol. 8, no. 10, pp. 5225-5237, October 2009;

[FRIEDMAN01] Friedman, James W. & Mezzetti, Claudio, 2001, "Learning in Games by Random Sampling," Journal of Economic Theory, Elsevier, vol. 98(1), pages 55-84, May;

[Narayanan02] Narayanan, Lata, "Channel assignment and graph multicoloring", in Handbook of wireless networks and mobile computing, ISBN 0-471-41902-8, pages 71-94, John Wiley & Sons, Inc., New York, N.Y., USA, 2002.

SUMMARY OF THE INVENTION

It is an object of the present invention to improve the prior art.

In particular, it is an object to solve the Dynamic spectrum allocation (DSA) problem.

According to a first aspect of the invention, there is provided an apparatus, comprising set defining means adapted to define a set of resources out of a first plurality of resources, wherein the resources are orthogonal radio resources; first controlling means adapted to control a transmitting means to simultaneously transmit a respective first radio signal for each resource on all resources of the set; interference estimating means adapted to estimate a respective estimated interference on each of the resources of the set when the respective first radio signals are transmitted simultaneously on all resources of the set; first selecting means adapted to select a first resource of the set if the estimated interference on the first resource exceeds a first predefined level; replacing means adapted to replace, in the set, the first resource by a second resource of the first plurality of resources not having been part of the set; first repetition controlling means adapted to control, upon a trigger, the first controlling means, the interference estimating means, the first selecting means, and the replacing means to perform in order each of the controlling and the estimating, the selecting, and the replacing, respectively, for a predefined time.

The apparatus may further comprise first calculating means adapted to calculate an enhancement number based on a number of resources in the first plurality of the resources, wherein the set defining means may be adapted to define the set of resources such that a number of the resources in the set is the enhancement number.

The apparatus may further comprise distinguishing means adapted to distinguish a resource of the first plurality of resources from a resource of a second plurality of resources, wherein the second plurality of resources does not comprise a resource of the first plurality of resources, and the first plurality of resources does not comprise a resource of the second plurality of resources; and the transmitting means may be further adapted to transmit a respective first radio signal on each resource of the second plurality of resources.

The apparatus may further comprise second controlling means adapted to control the transmitting means to simultaneously transmit a respective second radio signal for each resource on all resources of the first plurality of resources; capacity measuring means adapted to measure a respective capacity of each of the plurality of resources; full use capacity determining means adapted to determine a full use capacity, wherein the full use capacity is a sum of the measured capacities of all the resources when the respective second radio signals are simultaneously transmitted on all the resources; second calculating means adapted to calculate a packed number based on a ratio of the full use capacity and a maximum capacity of each resource, wherein a number of the resources in the set is the packed number.

The apparatus may further comprise second selecting means adapted to select the second resource based on best-reply dynamics or better-reply dynamics.

In the apparatus, the interference estimating means may be adapted to estimate the respective estimated interference on one of the resources based on a signal strength received on the one of the resources.

The apparatus may further comprise trigger receiving means adapted to receive the trigger.

According to a second aspect of the invention, there is provided an apparatus, comprising set defining processor adapted to define a set of resources out of a first plurality of resources, wherein the resources are orthogonal radio resources; first controlling processor adapted to control a transmitting means to simultaneously transmit a respective first radio signal for each resource on all resources of the set; interference estimating processor adapted to estimate a respective estimated interference on each of the resources of the set when the respective first radio signals are transmitted simultaneously on all resources of the set; first selecting processor adapted to select a first resource of the set if the estimated interference on the first resource exceeds a first predefined level; replacing processor adapted to replace, in the set, the first resource by a second resource of the first plurality of resources not having been part of the set; first repetition controlling processor adapted to control, upon a trigger, the first controlling processor, the interference estimating processor, the first selecting processor, and the replacing processor to perform in order each of the controlling and the estimating, the selecting, and the replacing, respectively, for a predefined time.

The apparatus may further comprise first calculating processor adapted to calculate an enhancement number based on a number of resources in the first plurality of the resources, wherein the set defining processor may be adapted to define the set of resources such that a number of the resources in the set is the enhancement number.

The apparatus may further comprise distinguishing processor adapted to distinguish a resource of the first plurality of resources from a resource of a second plurality of resources, wherein the second plurality of resources does not comprise a resource of the first plurality of resources, and the first plurality of resources does not comprise a resource of the second plurality of resources; and the transmitting processor may be further adapted to transmit a respective first radio signal on each resource of the second plurality of resources.

The apparatus may further comprise second controlling processor adapted to control the transmitting processor to simultaneously transmit a respective second radio signal for each resource on all resources of the first plurality of resources; capacity measuring processor adapted to measure a respective capacity of each of the plurality of resources; full use capacity determining processor adapted to determine a full use capacity, wherein the full use capacity is a sum of the measured capacities of all the resources when the respective second radio signals are simultaneously transmitted on all the resources; second calculating processor adapted to calculate a packed number based on a ratio of the full use capacity and a maximum capacity of each resource, wherein a number of the resources in the set is the packed number.

The apparatus may further comprise second selecting processor adapted to select the second resource based on best-reply dynamics or better-reply dynamics.

In the apparatus, the interference estimating processor may be adapted to estimate the respective estimated interference on one of the resources based on a signal strength received on the one of the resources.

The apparatus may further comprise trigger receiving processor adapted to receive the trigger.

According to a third aspect of the invention, there is provided a system, comprising a reuse enhancement apparatus according to the first aspect comprising the distinguishing means; a packing apparatus according to the first aspect comprising the full use determining means; wherein the first plurality of resources of the packing apparatus comprises the first plurality and the second plurality of resources of the reuse enhancement apparatus; the set of the packing apparatus obtained after the controlling, estimating, selecting, and replacing have been repeated for the predefined time comprises the second plurality of resources of the reuse enhancement apparatus.

In the system, the transmitting means of the packing apparatus may be the same as the transmitting means of the reuse enhancement apparatus; and the interference estimating means of the packing apparatus may be the same as the interference estimating means of the reuse enhancement apparatus.

In the system, the set defining means of the reuse enhancement apparatus may be adapted to define the set of resources such that a number of resources in the set is one, the reuse enhancement apparatus may further comprise second repetition control means adapted to control the set defining means and the first repetition controlling means of the reuse enhancement apparatus to perform, in order for a number of times, the defining and repeating, respectively, wherein the set defining means may be further adapted to increase the number of resources in the set at each repetition by the second repetition control means.

The system may further comprise stopping means adapted to stop the second repetition control means if an average estimated interference of the respective estimated interferences on the resources of the set and/or a maximum estimated interference of the respective estimated interferences on the resources of the set is above a third predefined level after the respective controlling by the first repetition controlling means has been performed for the predefined time.

In the system, the number of times may be based on the number of resources in the first plurality of resources of the reuse enhancement apparatus.

According to a fourth aspect of the invention, there is provided a system, comprising a reuse enhancement apparatus according to the second aspect comprising the distinguishing processor; a packing apparatus according to the second aspect comprising the full use determining processor; wherein the first plurality of resources of the packing apparatus comprises the first plurality and the second plurality of resources of the reuse enhancement apparatus; the set of the packing apparatus obtained after the controlling, estimating, selecting, and replacing have been repeated for the predefined time comprises the second plurality of resources of the reuse enhancement apparatus.

In the system, the transmitting processor of the packing apparatus may be the same as the transmitting processor of the reuse enhancement apparatus; and the interference estimating processor of the packing apparatus may be the same as the interference estimating processor of the reuse enhancement apparatus.

In the system, the set defining processor of the reuse enhancement apparatus may be adapted to define the set of resources such that a number of resources in the set is one, the reuse enhancement apparatus may further comprise second repetition control processor adapted to control the set defining processor and the first repetition controlling processor of the reuse enhancement apparatus to perform, in order for a number of times, the defining and repeating, respectively, wherein the set defining processor may be further adapted to increase the number of resources in the set at each repetition by the second repetition control processor.

The system may further comprise stopping processor adapted to stop the second repetition control processor if an average estimated interference of the respective estimated interferences on the resources of the set and/or a maximum estimated interference of the respective estimated interferences on the resources of the set is above a third predefined level after the respective controlling by the first repetition controlling processor has been performed for the predefined time.

In the system, the number of times may be based on the number of resources in the first plurality of resources of the reuse enhancement apparatus.

According to a fifth aspect of the invention, there is provided a method, comprising defining a set of resources out of a first plurality of resources; and repeating, upon a trigger, in order for a predefined time: each of transmitting simultaneously a respective first radio signal for each resource on all resources of the set, and estimating a respective estimated interference on each of the resources of the set when the respective first radio signals are transmitted simultaneously on all resources of the set; selecting a first resource of the set if the estimated interference on the first resource exceeds a first predefined level; and replacing, in the set, the first resource by a second resource of the first plurality of resources not having been part of the set.

The method may be a method of spectrum sharing.

The method may further comprise calculating an enhancement number based on a number of resources in the first plurality of the resources, wherein the set of resources is defined such that a number of the resources in the set is the enhancement number.

The method may further comprise distinguishing a resource of the first plurality of resources from a resource of a second plurality of resources, wherein the second plurality of resources does not comprise a resource of the first plurality of resources, and the first plurality of resources does not comprise a resource of the second plurality of resources; and transmitting a respective first radio signal on each resource of the second plurality of resources.

The method may further comprise transmitting a respective second radio signal for each resource on all resources of the first plurality of resources; measuring a respective capacity of each of the plurality of resources; determining a full use capacity, wherein the full use capacity is a sum of the measured capacities of all the resources when the respective second radio signals are simultaneously transmitted on all the resources; calculating a packed number based on a ratio of the full use capacity and a maximum capacity of each resource, wherein a number of the resources in the set is the packed number.

The method may further comprise selecting the second resource based on best-reply dynamics or better-reply dynamics.

In the method, the respective estimated interference on one of the resources may be estimated based on a signal strength received on the one of the resources.

The method may further comprise receiving the trigger.

According to a sixth aspect of the invention, there is provided a method, comprising a reuse enhancement method according to the fifth aspect comprising distinguishing a resource; a packing method according to the fifth aspect comprising determining a full use capacity; wherein the first plurality of resources of the packing method comprises the first plurality and the second plurality of resources of the reuse enhancement method; the set of the packing method obtained after the transmitting, estimating, selecting, and replacing have been repeated for the predefined time comprises the second plurality of resources of the reuse enhancement method.

The method may be a method of spectrum sharing.

In the method, the set of the reuse enhancement method may be defined such that a number of resources in the set is one, the reuse enhancement method may further comprise repeating, in order for a number of times, the defining of the set and the repeating of the transmitting, of the estimating, of the selecting, and of the replacing, wherein the number of resources in the set may be increased at each repetition of the defining and the repeating of the transmitting, of the estimating, of the selecting, and of the replacing.

The method may further comprise stopping the repetition of the defining and the repeating if an average estimated interference of the respective estimated interferences on the resources of the set and/or a maximum estimated interference of the respective estimated interferences on the resources of the set is above a third predefined level after the respective repeating has been performed for the predefined time.

In the method, the number of times may be based on the number of resources in the first plurality of resources of the reuse enhancement method.

According to a seventh aspect of the invention, there is provided a computer program product including a program comprising software code portions being arranged, when run on a processor of an apparatus, to perform the method according to any one of the fifth and sixth aspects.

The computer program product may comprise a computer-readable medium on which the software code portions are stored, and/or the program may be directly loadable into a memory of the processor.

According to embodiments of the invention, at least the following advantages are achieved:

Although embodiments of the invention may belong conceptually to a co-existence DSA solution they reach approximately the performance of a co-operative DSA solution.

In embodiments of the invention, a similar or better performance than according to [GRACE09] may be achieved without the burden of fine-tuning of parameters.

It is to be understood that any of the above modifications can be applied singly or in combination to the respective aspects to which they refer, unless they are explicitly stated as excluding alternatives.

BRIEF DESCRIPTION OF THE DRAWINGS

Further details, features, objects, and advantages are apparent from the following detailed description of the preferred embodiments of the present invention which is to be taken in conjunction with the appended drawings, wherein FIG. 1 shows a principle of resource allocation according to an embodiment of the invention;

FIG. 2 shows a sequence of phases according to an embodiment of the invention;

DETAILED DESCRIPTION OF CERTAIN EMBODIMENTS

Figure 3:
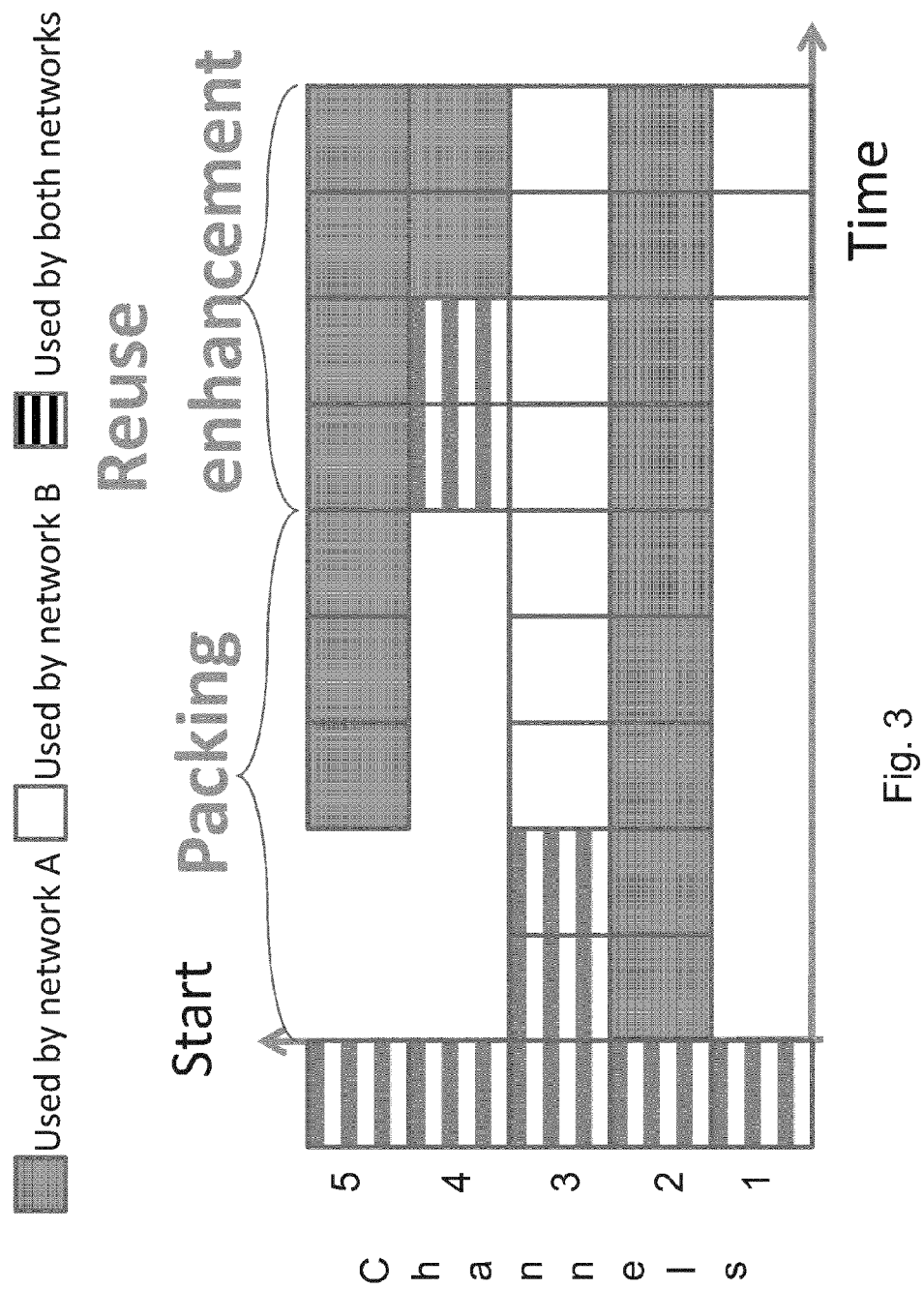
FIG. 3 shows a time chart of the use of resources by two networks according to an embodiment of the invention.

Herein below, certain embodiments of the present invention are described in detail with reference to the accompanying drawings, wherein the features of the embodiments can be freely combined with each other unless otherwise described. However, it is to be expressly understood that the description of certain embodiments is given for by way of example only, and that it is by no way intended to be understood as limiting the invention to the disclosed details.

Moreover, it is to be understood that the apparatus is configured to perform the corresponding method, although in some cases only the apparatus or only the method are described.

According to embodiments of the invention, each wireless network or network element in a network deployment scenario, such as a local area deployment, may perform autonomously the following 3 steps in order to solve the DSA problem with optimal performance:

1. Determine the achievable throughput when the spectrum band is used without any co-existence procedure.
2. Determine a new spectrum allocation which can achieve exactly or substantially the same throughput determined in step 1 while using the minimum amount of spectral resources
3. Increase the spectrum usage respecting a particular re-division rule and maximum interference generation.

In addition, as an underlying procedure for all the 3 steps, inter-network interference measurement/estimation may be performed on all channels.

FIG. 1 illustrates these 3 steps for an embodiment with two networks A, B in the local area. In this embodiment, a wireless network should be exemplarily regarded as a set of wireless nodes which communicate directly with their user equipments. In FIG. 1 the axes show the amount of resources (such as band, time, channels, codes or a combination thereof) that may be allocated by each network. The straight dashed lines represent the situation where a particular network is allocating all the resources. The circles illustrate allocations which have the same sum capacity, whereof the dashed parts show allocations which are not feasible.

Typically, when using no DSA solution, all resources will be used during congestion times. Therefore, in most cases, step 1 corresponds to calculate the capacity of a full resource re-utilization. In cases of high interference coupling such full reuse of resources may lead to inefficient use of the spectrum. This point is marked as "1" in FIG. 1.

In step 2, the usage of resources is reduced more or less drastically while the same capacity as calculated in step 1 is maintained. In the particular example of FIG. 1, at the point marked as "2", all networks have substantially (or exactly) the same capacity as at the point marked as "1", but at point "2", there are resources which are not used. Therefore, point "2" may be described as: keep the capacity substantially or exactly the same as before, with substantially or exactly the same share for each network as at point "1".

In step 3, all resources are put into use again, in order to achieve the maximum spectral efficiency. Thus, the allocation of point "3" may be reached. The exact share of resources achievable by each network on step 3 is bound to spectrum policies and scenario topology.

Step 1 provides a calculation of a reference capacity. However, according to embodiments of the invention, step 2 may be applied with any other reference capacity. Therefore, some main features of embodiments of the invention are:

An algorithm which, given a target capacity for each network, will minimize the number of used resources (step 2). Note that this could be a stand-alone solution for spectrum refarming according to some embodiments of the invention.

An algorithm which, given an interference threshold, may determine the tightest spectrum reuse based on timeouts and interference measurements (step 3). Note that this could be a stand-alone solution for interference avoidance according to some embodiments of the invention.

A combination of step 2 and step 3 as a complete DSA solution according to some embodiments of the invention.

The details of how these 3 steps may be accomplished without any signalling across different networks are explained in more details later.

Embodiments of the invention comprise a distributed algorithm/protocol to decide on spectrum or channel allocation of wireless communication systems. The protocol can be set to mimic the allocation which would be devised according to a bargaining concept, but without the costly inter-cell signalling present in the prior art on bargaining theory in spectrum allocation, such as [SURIS09]. Note also, that inter-network signalling may not be possible at all on a multi-operator scenario. Therefore, a solution as according to embodiments of this invention may be preferred.

In the context of the following explanation, for example, a femtocell access point may be considered as a wireless network, i.e., one network=one femtocell which may be accessed by one or more user devices. Correspondingly, a network comprising plural access points may be considered as a collection of plural networks. Nevertheless, embodiments of the invention may be applied to larger networks, too. In this case, signalling between the nodes of the network may be required.

As previously explained, without a set DSA method, a greedy allocation of all resources is to be expected during the most congested times. Then, a particular network can determine its own worst case throughput by measuring the throughput during times it has enough load to have a high utilization of resources. Therefore, step 1 of embodiments of this invention may be accomplished simply by measuring the worst case throughput during such congested times. Hereafter, this capacity is referred to as the reuse 1 capacity, and it is denoted as $C_1^{TO}$.

In order to perform steps 2 and 3, a protocol is provided according to embodiments of the invention. The protocol may comprise two phases with different targets for spectrum allocation:

Packing: during packing phase, the wireless networks attempt to achieve the same performance of a reuse 1 allocation with the minimum amount of resources. Compared to the reuse 1 case, this approach creates a surplus of channels/spectrum available for allocation with reasonable interference levels.

Reuse enhancement: during this phase, the networks attempt to enhance the reuse of spectrum, by allocating more channels made available by the surplus of packing phase. This phase can be composed of several stages, in order to determine the possible reuse.

This concept is illustrated in FIG. 2. Remind that in some embodiments of the invention, each of the packing phase and the reuse enhancement phase may be applied without the respective other phase, i.e. as stand-alone solution.

Note that, if the reuse 1 capacity is high (low interference coupling), the allocation of resources is not (or hardly) modified by the protocol (as there is no problem to solve). A high reuse 1 capacity means that the total capacity (the sum of the actual capacities of the allocated resources) is in the same order as the sum of the maximum capacities of the allocated resources. Conversely, if the interference coupling with other networks is high, each network will change its spectrum allocation and achieve a better performance than in reuse 1 case.

More in detail, let N be the number of available channels on the spectrum band of interest, wherein the channels may be orthogonal in the frequency doamin.

Furthermore, the capacity $C_F$ which can be achieved on a single channel, if the channel is free of interference from other networks, should be determined. For example, $C_F$ may be a predetermined value based on the characteristics of the channel, or it may be measured at times when the network is basically idle (e.g. at night). From these 2 figures, $C_F$ and the reuse 1 capacity $C_1^{TOT}$, the network may derive the minimum number of interference free channels in order to achieve the same capacity as the reuse 1 configuration. For network A, this quantity is denoted as:

$$N_1^A = \frac{C_1^{TOT}(A)}{C_F^A} \quad (1)$$

In this respect, it is noted that the quantities $C_F$ and $C_1^{TOT}$ may be specific for each network. Then, each network can calculate the number of channels to be used during the packing phase (exemplarily for network A):

$$N_{packing}^A = N_1^A + N_M \quad (2)$$

Where, $N_M$ is a margin. Note that the margin may be used to provide a minimum number of channels. In some embodiments, the margin may be the same for all networks, while in others it may be different for different networks. Normally, a wireless network can only allocate an integer number of channels. Therefore, if the number $N_{packing}^A$ is not an integer, then it may be rounded down or up prior to further calculations.

During the packing phase, each network fixes the amount of used channels, while updating the actual channel selection. Therefore, network A will have $N_{packing}^A$ channels allocated, network B will have $N_{packing}^B$ channels allocated, and so forth.

The actual selection of channels is updated according to a distributed dynamic approach, such as best-reply dynamics [FRIEDMAN01] or better-reply dynamics [FRIEDMAN01]. The target of such update is to use the channel set which accommodates the maximum acceptable incoming interference under the constraint of minimum required capacity.

As a result of the packing phase, each network has a channel allocation, e.g. the allocation of network A in the end of packing phase is denoted $S_{A0}$.

Furthermore, each network may determine that the remaining channels are either:

Allocated by other networks which do share a strong interference coupling with the network in consideration. In order to protect these networks from interference, these set may be marked as a prohibited set $P_{A0}$. Alternatively, the prohibited set may also be accessible but with extra protection (e.g. reduced power or sensing before transmission)

Not allocated by other networks, or only allocated by other networks which do not have a strong interference coupling with the network in consideration. This latter set of channels will be denoted as the free channels, $F_{A0}$ The distinction between these 2 sets of channels (prohibited/not allocated) may be determined based on an interference threshold. The channels which are already allocated, $S_{A0}$, or that are marked as prohibited, $P_{A0}$, may need strong interference protection. For this reason, these allocation may not be further changed during the reuse enhancement phase.

In this case, each network will only change the allocation of the channels which were not allocated during the packing phase, i.e. $F_{AO}$. As described earlier, some embodiments may also consider access to the set $P_{AO}$, in which case the channels available for reuse enhancement phase are $F_{AO} \cup P_{AO}$, not only $F_{AO}$. For consistency, hereafter the set of channels available for allocation by network A in the reuse enhancement phase is denoted as $R_{AO}$, where $R_{AO}$ may refer to $F_{AO}$ or $F_{AO} \cup P_{AO}$. A target of the reuse enhancement phase is to maximize the throughput surplus compared to a reuse 1 allocation. This is done by accessing as many channels as possible in $R_{AO}$ without generating excessive interference towards other wireless networks as discussed next.

The reuse enhancement phase may be divided into stages, in order to partition the problem into:
  Determining the number of extra channels which can be allocated. The idea of having several stages is to determine which is the feasible frequency reuse for the surplus resources.
  Determining which channels shall actually be allocated. This is done within a stage and it can be accomplished by an iterative process of channel allocation update (within the set $R_{AO}$ for network A).

The reuse of resources may be pre-defined for each stage. The following description is an implementation according to embodiments of the invention.

Let K be the maximum frequency reuse to be supported for the surplus resources. Then reuse 2 is tried in stage 1, reuse 3 is tried in stage 2 up to reuse K is tried on stage K−1. If reuse k is feasible, then there is no need to further re-divide the resources and the stages k+1, k+2, ..., K−1 may not be performed.

If the reuse enhancement phase is used as a stand-alone procedure for interference avoidance, then, according to some embodiments of the invention, a better implementation may be to attempt reuse 1 in stage 1, reuse 2 in stage 2 and, in general reuse k in stage k.

The feasibility of a particular allocation may be detected by verifying the existence or non-existence of an abnormal condition. Such condition may be based on interference measurements as discussed next.

In the reuse enhancement phase, a target is to reuse as many resources as possible without significant degradation for the throughput performance of nearby networks. Ideally, to achieve this target, a wireless network according to some embodiments of the invention should be able to determine the actual interference it generates towards neighbour networks. This may not be feasible without explicit signalling among networks. Therefore, an alternative may be used in some embodiments of the invention: Typically it is possible for a wireless network to measure the incoming interference instead of the outgoing interference. It is expected that this does not bring a significant drawback to this algorithm.

Considering this observation, the implementation of the triggering condition for starting a new stage may be described as follows:
  1. Each stage has a predefined duration which may be determined e.g. based on the number of repetitions of steps 2 to 4.
  2. The wireless networks sense the channels on the available set ($R_{AO}$ for network A and so on)
  3. Using a distributed update process, such as best-reply dynamics [FRIEDMAN01] or better-reply dynamics [FRIEDMAN01], the wireless networks may minimize the interference for a particular stage.
  4. When the duration of the stage is timed out, each wireless network checks if all the allocated channels on set $R_{AO}$ have the interference below a threshold. (Ideally this should be outgoing interference. In practice, in some embodiments, incoming interference will be used).
  5. If the interference is within the threshold or if there are no more stages, then the wireless network has its final allocation and a new stage is not needed. If the interference is above the threshold, then the wireless network move onto next stage.

The stages do not need to be fully synchronized. If the duration of the phases is known by all networks, the only synchronization need is to determine the start of the algorithm. Still, only a loose synchronization is needed. Three exemplary options to determine the start of the algorithm are as follows:
  A network broadcasts a beacon;
  Using a common time reference. In the context of femtocells, this could be provided directly over-the-air by a macrocell. In the context of cognitive radio, this could be signalled on the cognitive pilot channel; and
  A command from Operations Support System (OSS) to all networks in an area to start the algorithm, e.g. via the X2 interface to a femto gateway.

These concepts, and the whole algorithm may be better understood based on an example according to an embodiment of the invention, using the allocation vs. time chart of FIG. 3.

Consider a situation where two networks, A and B, have very significant interference coupling. There are a total of 5 component carriers (channels) available. Furthermore, the interference coupling is asymmetric such that the total reuse 1 capacity of network A is $C_1^{TOT}=100$ Mbps, whereas for network B $C_1^{TOT}(B)=25$ Mbps. Assuming $C_F^A=C_F^B=50$ Mbps, then network A determines from equation (1) that $N_1^A=2$ and network B calculates $N_1^B=0.5$. Assuming zero margin, i.e. $N_M=0$ and rounding up $N_1^B$, the number of channels to be used on packing phase are: $N_{packing}^A=2$ and $N_{packing}^B=1$.

The initial allocation for packing phase can be chosen randomly (respecting the desired number of channels). One example is shown in FIG. 3. Network A starts by allocating channels 2 and 3. Network B starts by allocating channel 3. By chance, both wireless networks have chosen channel 3. In such case, channel 3 will be operating with considerable interference. At this point, neither network can match their respective capacities for the packing phase: $C_1^{TOT}(A)=100$ Mbps and $C_1^{TOT}(B)=25$ Mbps.

If a best reply or better reply dynamics is used, a network may decide to evaluate a potential new allocation with a given probability, e.g. 50%. There is no need for synchronization of the networks in such an update process.

In the example of FIG. 3, on the first and second periods after the start of the packing phase, there is no network update. For the third period, network A decides to attempt a new allocation. By evaluating the interference on period 2, network A is able to determine that it can match the reuse 1 capacity by choosing a different channel other than channel 3. Note that A still allocates $N_{packing}^A=2$ channels.

On periods 3, 4 and 5, even if one of the networks decides to evaluate a new allocation, there is no need to actually change the channel. Since the reuse 1 capacities $C_1^{TOT}(A)$ and $C_1^{TOT}(B)$ are already met, there is no improvement in changing the allocated channels.

Continuing with the example of FIG. 3, by the end of the packing phase, wireless network A can determine $R_{AO}=2$ resources and wireless network B can determine $R_{BO}=2$ resources. In stage 1 a reuse 2 of the remaining resources is attempted. Therefore, each network will allocate one extra channel. By chance, both of them allocate channel 4.

Using again best or better reply dynamics, one of the networks will eventually change for another channel. In FIG. 3, network B will change to channel 1 in period 8. That is the final allocation, which can be considered efficient and fair for this particular example as may be seen from the following:

Recap that $C_F^A=C_F^B=50$ Mbps. Since network A has 3 channels, the total capacity it can achieve is 150 Mbps, up from an initial capacity of 100 Mbps. The end result is even more favourable to wireless networks which suffer a lot from incoming interference. For network B the final capacity is 100 Mbps, whereas in a reuse 1 configuration network B can only achieve 25 Mbps.

In some embodiments, a network may also fallback one or more stages if the potential interference is sufficiently small over a period of time. For example, referring to FIG. 3, if network A stops using resource 4 (after the final allocation). Then, after some time network B may be allowed to fall back to a reuse 1 configuration on the resources $R_{B0}$ (resources 1 and 4) and therefore, keep using resource 4 until network A decides to use it again.

Therefore, wireless networks according to embodiments of the invention may find an efficient and fair dynamic spectrum allocation without ever exchanging messages directly across the wireless networks. Some of the possible use cases of this technology are:

Dynamic spectrum decision algorithm for cognitive radio networks; and

Selecting component carriers dynamically in LTE-Advanced networks

Determining a subset of resources for transmission in LTE or LTE-Advanced networks.

In some embodiments of the invention, the packing phase is replaced by an efficient algorithm to solve the well known graph multi-coloring problem [Narayanan02], with some loss of efficiency. However, a wireless network implementation of these algorithms to solve such a problem typically would involve exchange of messages between pairs of wireless networks or even a centralized controller running the algorithm. We expect to achieve a better performance by using the above described packing approach, preferably without any direct signalling among wireless networks.

Figure 5:
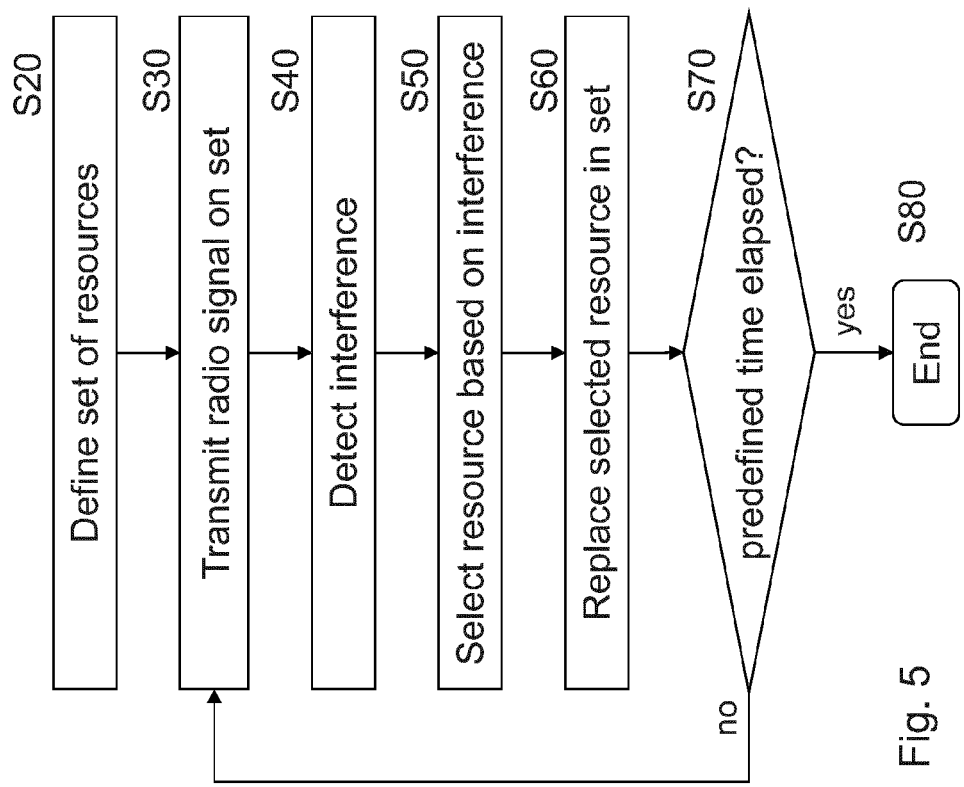
FIG. 5 shows a method according to an embodiment of the invention.
Figure 4:
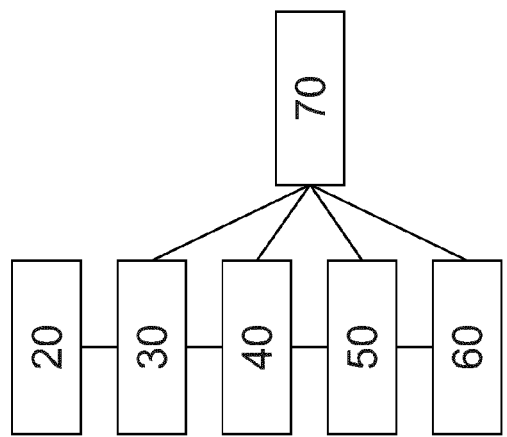
FIG. 4 shows an apparatus according to an embodiment of the invention.

FIG. 4 shows an apparatus according to an embodiment of the invention. The apparatus may be a wireless access point. FIG. 5 shows a method according to an embodiment of the invention. The apparatus according to FIG. 4 may perform the method of FIG. 5 but is not limited to this method.

The method of FIG. 5 may be performed by the apparatus of FIG. 4 but is not limited to being performed by this apparatus.

The apparatus comprises set defining means 20, controlling means 30, interference estimating means 40, selecting means 50, replacing means 60, and repetition controlling means 70.

The set defining means 20 defines a set of resources out of the plurality of resources (S20). Upon control by the controlling means 30, a transmitting means may transmit a radio signal on all resources of the set (S30). The radio signal may be the same for all resources or different for some or all of them. The interference estimating means 40 estimates an interference on each of the resources of the set (S40). If the interference estimated for one of the resources of the set is too large, it is selected by the selecting means 50 (S50). The replacing means 60 replaces the selected resource by a resource which has not been in the set (S60).

Steps S30 to S60 are repeated in order for a predefined time (S70). Therein, the order of transmitting (S30) and estimating (S40) may be interchanged, or these steps may be performed simultaneously. The transmitting (S30) may be performed continuously during each repetition cycle. If the predefined time is elapsed, the method ends (S80). The repetitions are controlled by the repetition control means 70.

If the plurality of resources comprises all resources available or allowed for the apparatus, the method of the embodiment may correspond to the packing phase. If it comprises only a subset, where other resources available or allowed for the apparatus are allocated to other networks, it may correspond to the reuse enhancement phase.

Embodiments of the invention are described based on an IMT system but embodiments of the invention may be applied to LTE, UMTS or any other radio access network with sufficient number of orthogonal resources such as channels (e.g. GERAN, EDGE, WLAN, Wi-Fi).

If not otherwise stated or otherwise made clear from the context, the statement that two entities are different means that they are differently addressed in their respective network. It does not necessarily mean that they are based on different hardware. That is, each of the entities described in the present description may be based on a different hardware, or some or all of the entities may be based on the same hardware.

According to the above description, it should thus be apparent that exemplary embodiments of the present invention provide, for example an access point apparatus such as a base station, or a component thereof, an apparatus embodying the same, a method for controlling and/or operating the same, and computer program(s) controlling and/or operating the same as well as mediums carrying such computer program(s) and forming computer program product(s).

Implementations of any of the above described blocks, apparatuses, systems, techniques or methods include, as non limiting examples, implementations as hardware, software, firmware, special purpose circuits or logic, general purpose hardware or controller or other computing devices, or some combination thereof.

It is to be understood that what is described above is what is presently considered the preferred embodiments of the present invention. However, it should be noted that the description of the preferred embodiments is given by way of example only and that various modifications may be made without departing from the scope of the invention as defined by the appended claims.

The invention claimed is:

1. Apparatus, comprising
a memory comprising software code portions; and
a processor,
wherein the processor, in response to executing the software code portions, causes the apparatus to perform operations comprising:
defining a set of resources out of a first plurality of resources, wherein the resources are orthogonal radio resources;
controlling a transmitter to simultaneously transmit a respective first radio signal for each resource on all resources of the set;
estimating a respective estimated interference on each of the resources of the set when the respective first radio signals are transmitted simultaneously on all resources of the set;

selecting a first resource of the set if the estimated interference on the first resource exceeds a first predefined level;

replacing, in the set, the first resource by a second resource of the first plurality of resources not having been part of the set;

controlling, upon a trigger, the operations of the controlling and the estimating, the selecting, and the replacing, respectively, for a predefined time controlling the transmitter to simultaneously transmit a respective second radio signal for each resource on all resources of the first plurality of resources;

measuring a respective capacity of each of the plurality of resources;

determining a full use capacity, wherein the full use capacity is a sum of the measured capacities of all the resources when the respective second radio signals are simultaneously transmitted on all the resources;

calculating a packed number based on a ratio of the full use capacity and a maximum capacity of each resource, wherein a number of the resources in the set is the packed number.

2. The apparatus according to claim 1, wherein the processor, in response to executing the software code portions, causes the apparatus to perform operations comprising: calculating an enhancement number based on a number of resources in the first plurality of the resources, wherein the defining defines the set of resources such that a number of the resources in the set is the enhancement number.

3. The apparatus according to claim 1, wherein the processor, in response to executing the software code portions, causes the apparatus to perform operations comprising: distinguishing a resource of the first plurality of resources from a resource of a second plurality of resources, wherein the second plurality of resources does not comprise a resource of the first plurality of resources, and the first plurality of resources does not comprise a resource of the second plurality of resources; and wherein the transmitter is further adapted to transmit a respective first radio signal on each resource of the second plurality of resources.

4. The apparatus according to claim 1, wherein the processor, in response to executing the software code portions, causes the apparatus to perform operations comprising:

selecting the second resource based on best-reply dynamics or better-reply dynamics.

5. The apparatus according to claim 1, wherein the estimating estimates the respective estimated interference on one of the resources based on a signal strength received on the one of the resources.

6. The apparatus according to claim 1, wherein the processor, in response to executing the software code portions, causes the apparatus to perform operations comprising: receiving the trigger.

7. System, comprising a reuse enhancement apparatus according to claim 3;

a packing apparatus comprising a memory comprising software code portions, and a processor, wherein the processor of the packing apparatus, in response to executing the software code portions, causes the packing apparatus to perform operations comprising:

controlling a transmitter of the packing apparatus to simultaneously transmit a respective second radio signal for each resource on all resources of the first plurality of resources;

measuring a respective capacity of each of the plurality of resources;

determining a full use capacity, wherein the full use capacity is a sum of the measured capacities of all the resources when the respective second radio signals are simultaneously transmitted on all the resources;

calculating a packed number based on a ratio of the full use capacity and a maximum capacity of each resource, wherein a number of the resources in the set is the packed number; and wherein the first plurality of resources of the packing apparatus comprises the first plurality and the second plurality of resources of the reuse enhancement apparatus; and wherein the set of the packing apparatus obtained after the controlling, estimating, selecting, and replacing have been repeated for the predefined time comprises the second plurality of resources of the reuse enhancement apparatus.

8. The system according to claim 7, wherein the transmitter of the packing apparatus is the same as the transmitter of the reuse enhancement apparatus; and the processor performing the interference estimating of the packing apparatus is a same processor that performs the interference estimating of the reuse enhancement apparatus.

9. The system according to claim 7, wherein the defining of the reuse enhancement apparatus defines the set of resources such that a number of resources in the set is one, the processor of the reuse enhancement apparatus, in response to executing the software code portions, causes the reuse enhancement apparatus to perform operations comprising controlling the set defining and the repetition controlling of the reuse enhancement apparatus to perform, in order for a number of times, the defining and repeating, respectively, wherein the defining is further adapted to increase the number of resources in the set at each repetition.

10. The system according to claim 9, wherein the processor of the reuse enhancement apparatus, in response to executing the software code portions, causes the reuse enhancement apparatus to perform operations comprising:

stopping the repetitions if an average estimated interference of the respective estimated interferences on the resources of the set and/or a maximum estimated interference of the respective estimated interferences on the resources of the set is above a third predefined level after the respective controlling has been performed for the predefined time.

11. The system according to claim 9, wherein the number of times is based on the number of resources in the first plurality of resources of the reuse enhancement apparatus.

12. Method, comprising defining a set of resources out of a first plurality of resources;

repeating, upon a trigger, in order for a predefined time:

each of transmitting simultaneously a respective first radio signal for each resource on all resources of the set, and estimating a respective estimated interference on each of the resources of the set when the respective first radio signals are transmitted simultaneously on all resources of the set;

selecting a first resource of the set if the estimated interference on the first resource exceeds a first predefined level;

replacing, in the set, the first resource by a second resource of the first plurality of resources not having been part of the set;

transmitting a respective second radio signal for each resource on all resources of the first plurality of resources;

measuring a respective capacity of each of the plurality of resources;

determining a full use capacity, wherein the full use capacity is a sum of the measured capacities of all the resources when the respective second radio signals are simultaneously transmitted on all the resources; and calculating a packed number based on a ratio of the full use capacity and a maximum capacity of each resource, wherein a number of the resources in the set is the packed number.

13. The method according to claim 12, further comprising calculating an enhancement number based on a number of resources in the first plurality of the resources, wherein the set of resources is defined such that a number of the resources in the set is the enhancement number.

14. The method according to claim 12, further comprising distinguishing a resource of the first plurality of resources from a resource of a second plurality of resources, wherein the second plurality of resources does not comprise a resource of the first plurality of resources, and the first plurality of resources does not comprise a resource of the second plurality of resources; and transmitting a respective first radio signal on each resource of the second plurality of resources.

15. The method according to claim 12, further comprising selecting the second resource based on best-reply dynamics or better-reply dynamics.

16. The method according to claim 12, wherein the respective estimated interference on one of the resources is estimated based on a signal strength received on the one of the resources.

17. The method according to claim 12, further comprising receiving the trigger.

18. Method, comprising
a reuse enhancement method according to claim 14;
a packing method; wherein
the packing method comprises
transmitting a respective second radio signal for each resource on all resources of the first plurality of resources;

measuring a respective capacity of each of the plurality of resources;

determining a full use capacity, wherein the full use capacity is a sum of the measured capacities of all the resources when the respective second radio signals are simultaneously transmitted on all the resources;

calculating a packed number based on a ratio of the full use capacity and a maximum capacity of each resource, wherein a number of the resources in the set is the packed number;

wherein the first plurality of resources of the packing method comprises the first plurality and the second plurality of resources of the reuse enhancement method; and wherein the set of the packing method obtained after the transmitting, estimating, selecting, and replacing have been repeated for the predefined time comprises the second plurality of resources of the reuse enhancement method.

19. The method according to claim 18, wherein
the set of the reuse enhancement method is defined such that a number of resources in the set is one, the reuse enhancement method further comprising repeating, in order for a number of times, the defining of the set and the repeating of the transmitting, of the estimating, of the selecting, and of the replacing, wherein the number of resources in the set is increased at each repetition of the defining and the repeating of the transmitting, of the estimating, of the selecting, and of the replacing.

20. The method according to claim 19, further comprising stopping the repetition of the defining and the repeating if an average estimated interference of the respective estimated interferences on the resources of the set and/or a maximum estimated interference of the respective estimated interferences on the resources of the set is above a third predefined level after the respective repeating has been performed for the predefined time.

21. The method according to claim 19, wherein the number of times is based on the number of resources in the first plurality of resources of the reuse enhancement method.

22. A computer program product including a program a non-transitory computer-readable medium on which the software code portions are stored, the software code portions being arranged, when run on a processor of an apparatus, to perform the method according to claim 12.

* * * * *

UNITED STATES PATENT AND TRADEMARK OFFICE
CERTIFICATE OF CORRECTION

| | | |
|---|---|---|
| PATENT NO. | : 9,538,528 B2 | |
| APPLICATION NO. | : 14/350118 | |
| DATED | : January 3, 2017 | |
| INVENTOR(S) | : Gustavo Wagner, Andrea Cattoni and Istvan Zsolt Kovacs | |

It is certified that error appears in the above-identified patent and that said Letters Patent is hereby corrected as shown below:

In Claim 22:
Column 18, Line 42, "a program" should be deleted.

Signed and Sealed this
Eleventh Day of April, 2017

Michelle K. Lee
*Director of the United States Patent and Trademark Office*